(12) United States Patent
Sloane

(10) Patent No.: US 11,809,310 B2
(45) Date of Patent: *Nov. 7, 2023

(54) HOMOMORPHIC ENCRYPTION-BASED TESTING COMPUTING SYSTEM

(71) Applicant: Bank of America Corporation, Charlotte, NC (US)

(72) Inventor: Brandon Sloane, Indian Land, SC (US)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/171,714

(22) Filed: Feb. 21, 2023

(65) Prior Publication Data
US 2023/0205683 A1 Jun. 29, 2023

Related U.S. Application Data

(63) Continuation of application No. 17/381,824, filed on Jul. 21, 2021, now Pat. No. 11,636,027.

(51) Int. Cl.
*G06F 11/36* (2006.01)
*H04L 9/00* (2022.01)
*G06F 11/32* (2006.01)

(52) U.S. Cl.
CPC ........ *G06F 11/3688* (2013.01); *G06F 11/323* (2013.01); *G06F 11/3684* (2013.01); *G06F 11/3692* (2013.01); *H04L 9/008* (2013.01)

(58) Field of Classification Search
None
See application file for complete search history.

(56) References Cited

U.S. PATENT DOCUMENTS

| 9,729,312 B2 | 8/2017 | Bathen |
| 9,900,147 B2 * | 2/2018 | Laine .................... H04L 9/0618 |
| 10,298,385 B2 | 5/2019 | Khedr et al. |
| 10,341,103 B2 | 7/2019 | Shaked et al. |

(Continued)

OTHER PUBLICATIONS

Potey, "Homomorphic Encryption for Security of Cloud Data", 2016, 7th International Conference on Communication, Computing and Virtualization 2016 (Year: 2016).*

(Continued)

*Primary Examiner* — Hossain M Morshed
(74) *Attorney, Agent, or Firm* — Banner & Witcoff, Ltd.

(57) ABSTRACT

A homomorphic encryption-based testing computing system provides a risk-based, automated, one-directional push of production data through a homomorphic encryption tool and distributes the encrypted data to use in testing of applications. Data elements and test requirements are considered when automatically selecting a homomorphic encryption algorithm. A decisioning component selects an algorithm to use to homomorphically encrypt the data set and a push mechanism performs one or both of the homomorphic encryption and distribution of the encrypted data set to at least one intended host. Once delivered, the testing software and/or testing procedures proceed using the encrypted data set, where results of the testing may be stored in a data store. A validation mechanism may validate the test data against production data and communicates whether testing was successful.

20 Claims, 3 Drawing Sheets

(56) References Cited

U.S. PATENT DOCUMENTS

| | | | |
|---|---|---|---|
| 10,439,798 B2 | 10/2019 | Savry et al. | |
| 10,693,628 B2 | 6/2020 | Singh et al. | |
| 11,636,027 B2* | 4/2023 | Sloane | G06F 11/3692 |
| | | | 717/124 |
| 2016/0254912 A1* | 9/2016 | Maniatakos | H04L 9/321 |
| | | | 713/168 |
| 2019/0182216 A1* | 6/2019 | Gulak | G06N 20/00 |
| 2019/0294956 A1 | 9/2019 | Cheung et al. | |
| 2019/0296910 A1* | 9/2019 | Cheung | G06N 3/084 |
| 2022/0121552 A1* | 4/2022 | Blatt | G06F 11/362 |

OTHER PUBLICATIONS

Yu, "Verifiable outsourced computation over encrypted data", 2018, ScienceDirect (Year: 2018).*

Manish Potey et al., Homomprphic Encryption for Security of Cloud Data, 2016, 7th International Conference on Communication, Computing and Virtualization 2016 (Year: 2016) pp. 7.

Xixun Yu, et al., Verifiable outsourced computation over encrypted data, 2018, Science Direct (Year: 2018), pp. 14.

* cited by examiner

HOMOMORPHIC ENCRYPTION-BASED TESTING COMPUTING SYSTEM

CROSS REFERENCE TO RELATED APPLICATION(S)

This application is a continuation of and claims priority to U.S. patent application Ser. No. 17/381,824 entitled "Homomorphic Encryption-Based Testing Computing System" filed on Jul. 21, 2021, which is incorporated by reference in its entirety.

BACKGROUND

Testing software during a development cycle may be challenging. The larger the software or application package, the more individual source and/or executable modules to be tested, the more challenging the problem may become. Thousands of tests may be run. The elapsed time to run a full test suite may extend to days, weeks, or months. This elapsed time may affect the development time and the delivery time. However, even after release of a tested application, errors may still occur and/or may be found in the field due to differences in a test data set and live production data, leading to further delays and resource utilization along with their associated costs in computing time available for further development and with development budgets.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure provide effective, efficient, scalable, and convenient technical solutions that address and overcome the technical problems associated with efficient and secure testing of applications using a homomorphic encrypted production dataset.

The homomorphic encryption-based testing computing system may provide a risk-based, automated, one-directional push of production data through a homomorphic encryption tool and may then distribute the homomorphically encrypted data to one or more connected lower level computing environments that may make use of the data, such as during testing of applications.

The homomorphic encryption-based testing computing system may include a component for creating an inventory of related systems in all connected computing environments and that may perform logging of data elements, data requirements, confidentiality requirements, transformation requirements, and/or computational requirements based on statistical and referential integrity requirements for performing homomorphic encryption algorithm selection. In some cases, a table of available homomorphic algorithm options, along with related referential integrity and statistical variation metadata, may be provided. This table may also include a risk-based schema which can be used when examining the data sets to make determinations about which algorithms may be sufficient and, thus available to serve as a translation before being pushed to the lower level environments.

In some cases, a decisioning component may use the inventory, table of algorithms, risk-based governance frameworks, and/or other data set metadata to inform a selection of an algorithm to use to homomorphically encrypt the data set. In some cases, a push mechanism may be configured to run on a periodic basis and/or an event-driven basis to perform one or both of the homomorphic encryption and distribution of the encrypted data set to at least one intended host. Once delivered, the testing software and/or testing procedures proceed as normal using the encrypted data set, where results of the testing may be stored in a data store until testing is complete. A validation mechanism may perform one or both of confirmation and integrity validation, where computations performed on the datasets in the production environment can actually be replayed in lower level environments on the encrypted datasets, and the opposite, where the results may be compared using the homomorphism to confirm identical results.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
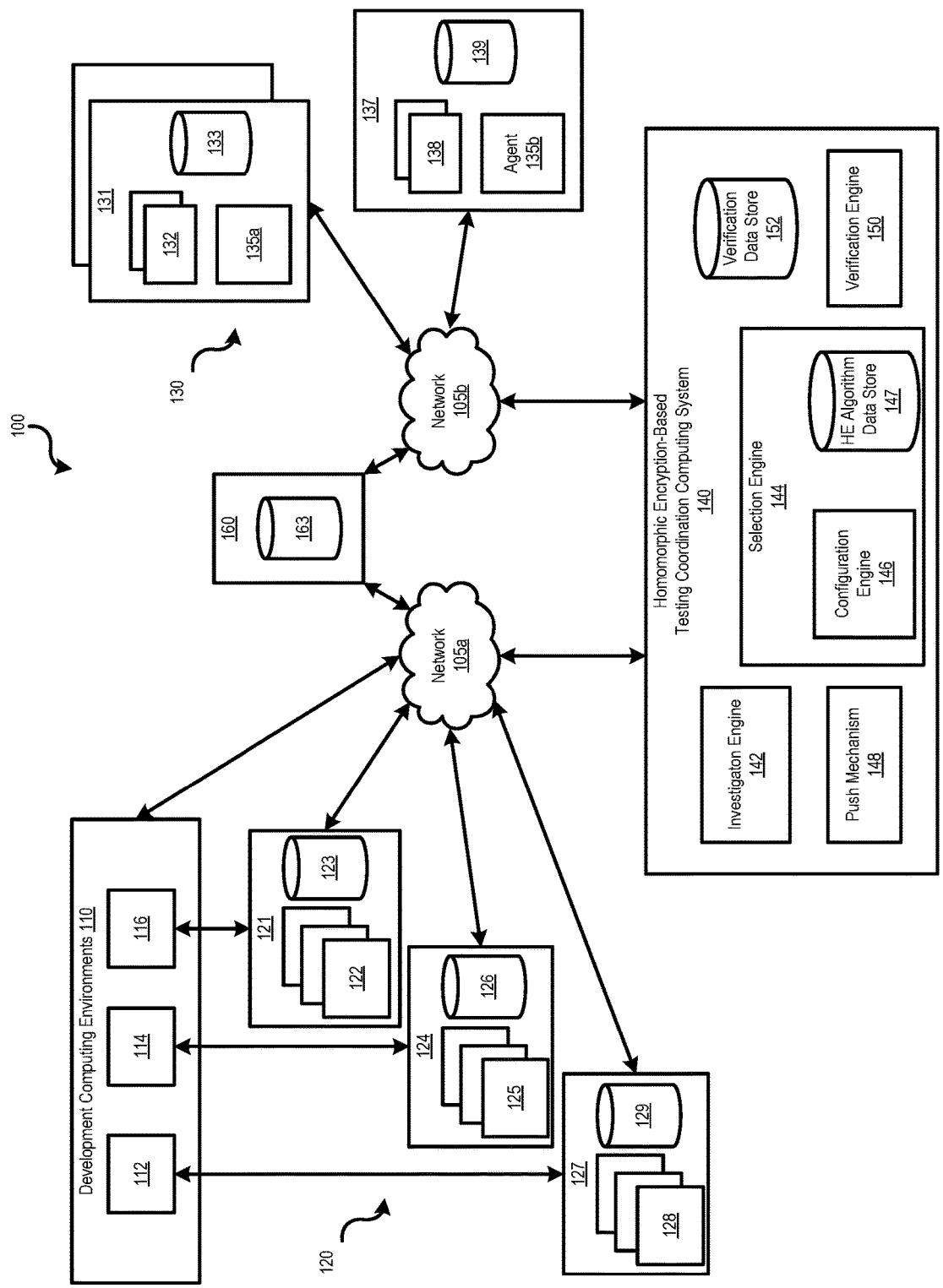
FIG. 1 shows an illustrative computing environment implementing a homomorphic encryption-based quality assurance testing system in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Enterprise organizations may provide products and/or services via one or more computing applications, such as stand-alone computing applications, web-based computing applications, mobile applications, and the like. Often, each application may operate as part of a larger system and/or may include multiple modules interacting in the background to provide a desired service or other functionality. Testing of the applications during a development cycle of a new build or release of the application may take the form of unit testing, integration testing, and/or functional testing. Unit testing may include testing individual modules of an application in isolation, where any dependencies on other modules or applications may be tested with static data without interaction with the other modules. As such, unit testing may provide a first check to provide confidence that individual modules are performing as expected. Integration testing may be performed as a next step, where operation of multiple modules may be tested together such as to test whether their combined functionality is operating as expected, such as to test interface communications between modules to ensure data transfers within an expected time and/or data format. Functional tests may refer to tests of at least a portion of the functionality of an application, as it would be provided in a production environment, where the application (or a portion of the application performing a specific functionality) is tested including with dependencies on outside applications and/or data sets. In an illustrative example, unit testing may be performed to test user interaction during a log-in procedure, such as testing of a data-entry module providing a user interface to ensure the user interface is presented as designed and data entry is received with desired formatting. Integration testing may integrate testing of the data-entry module with a user verification module to verify entered user credentials. An illustrative functionality test may be performed to test an application that allows a user to interact with aspects of a user account, such as an electronic banking application, where the data-entry module and the user verification module are further tested in combination with other software modules.

In many cases, applications and services running in production environments associated with an enterprise organization may process sensitive, private, or otherwise non-public information. When the applications and/or computing services are being developed, the applications and/or portions of the applications are often testing in multiple computing environments and/or configurations by developers, software testers, quality assurance engineers and the like. When testing the applications or portions of the applications in non-production environments, finding realistic test data sets similar to production data sets is often difficult, if not impossible without exposing production data to unauthorized individuals or to devices lacking proper security controls. For example, development environments may have different access controls, where data used in testing may be exposed to many individuals while being used during multiple tests. As such a need has been recognized for utilizing homomorphisms as a way of masking production data, so that testing may be performed in lower level environments using actual production data and without exposing actual production data to the development environments.

During development of applications, tests are performed to ensure the applications operate as expected. The data sets used during testing may not accurately reflect the information processed by the applications in a production environment. In such cases, after release into production, the applications often encounter a greater number of defects for a period of time following the release, often up to 6 months. In some cases, due to a severity of a particular defect, user trust may be lost which may delay adoption and/or use of the new version. In many cases, many of the defects could be avoided had production-like data been available when testing occurred during the development process before the production release. To improve reliability of testing for applications and/or services before the applications or services are released in a production environment, workable, and secure, production data sets may be used. The homomorphic encryption-based testing computing system, as described herein, may provide useful test production data in lower level environments, without replicating any secure data from the production environment. For example, homomorphic encryption-based testing computing system may provide a risk-based and directional push of production data utilizing one or more homomorphic encryption algorithms to encrypt and obscure the production data. The applications may be tested using the homomorphically encrypted data, without decrypting the data, such that test encrypted results are returned. The homomorphic encryption-based testing computing system also receives the encrypted test results and validates the results against similar results obtained from the production data. Once the verification process completes, the homomorphic encryption-based testing computing system may return an indication of success or failure of the tests to a user that initiated the testing. During this process, no production only the homomorphic encryption-based testing computing system may have access to the unencrypted production data sets tied to the actual application or service being developed, so the selection of the data sets may be captured. The data is unique to the application, as each application has different needs.

An encryption selection may process different criteria, such as a level of security associated with the encryption and/or computational requirements corresponding to processing of the encrypted data based on the encryption scheme. For example, homomorphic encryption may be performed as partial homomorphic encryption or full homomorphic encryption depending on testing requirements at lower level testing computing systems. For example, the homomorphic encryption-based testing computing system may process logic to define which encryption algorithms may be uses, such as by considering a testing environment, types of tests being performed (e.g., arithmetic functions, statistical functions, Boolean checks, and the like), where partial homomorphic encryption may be desired for certain functions because the testing would be less computationally intensive than a full garbled circuit implementation, for example. As such, the homomorphic encryption-based testing computing system may include the selection mechanism to determine an encryption algorithm selection based on low level testing needs.

Current testing procedures process a test data set that is distinct from the production data, so that any tests of the application functionality cannot be confirmed with the production data set. However, when using the homomorphically encrypted data sets, the results can be confirmed, such as with a match with production data set results. Such testing and verifications may reduce a number of unexpected defects encountered after a release. Additionally, the homomorphic encryption-based testing computing system includes inherent security and privacy advantages as well, based on principles of homomorphic encryption.

FIG. 1 shows an illustrative computing environment implementing a homomorphic encryption-based quality assurance testing system in accordance with one or more aspects described herein. For example, an enterprise computing environment used for testing and providing computer implemented applications and/or services may include a plurality of development computing environments 110, one or more testing computing environments 120, one or more production computing environments 130, and a homomorphic encryption-based testing coordination computing system 140.

The development computing environments may include one or more developer (e.g., software developer) computing systems 112, one or more software test computing systems 114, and/or one or more quality assurance computing systems 116. Each computing systems of the development computing environments 110 may utilize one or more testing computing environments 120, where communication between computing systems and computing environments are performed via one or more public or private networks, such as the enterprise networks 105a and 105b. For example, the developer computing systems 112 may coordinate testing using the test computing environment 127, where the test computing environments may, for example, be configured to test one or more software modules of an application 128 or combinations of software computing modules and utilizing data stored in the data store 129. The software test computing systems 114 may be configured to utilize the test computing environment 124 to test one or more applications 125, or combinations of software modules, based on data stored in the data store 126. Additionally, the quality assurance computing system may be configured to test one or more application builds 122, either pre-release or in an attempt to recreate a defect reported from production and using the test computing environment 121 and based on data stored in the data store 123.

In some cases, the one or more production computing environments 130 may include one or more computing environments 131, 137 configured to support operation of an application 132, 138 or service. Each application or service 132, 138 may process data stored in one or more production data stores 133, 139 associated with the applications or services running in the production computing environments 130. In some cases, the production data stores 133, 139 may store at least some sensitive, private, secure or otherwise non-public information. While such information may be useful to for testing of an associated application, or application modules, by the testing computing environments 120, security protocols, regulations and/or laws may prohibit such sharing, if the data remains unencrypted or otherwise available to access by unauthorized individuals.

The homomorphic encryption-based testing coordination computing system 140 may include an investigation engine 142, a selection engine 144, a push mechanism 148, a homomorphic encryption algorithm data store 147, a verification engine 150, and a verification data store 152. In some cases, the HE-based testing coordination computing system 140 may be communicatively coupled to a staging server 160 to facilitate staging of encrypted data stores in a staging data store 163. In general, an application being developed may be analyzed to identify data requirements for operation along with security and/or confidentiality requirements associated with the application. In some cases, data set security information and/or use case definitions may be used to identify computational requirements of the applications. In some cases, data sets may be encrypted differently, for a same application, depending on what tests are being performed. In such cases, the HE-based testing coordination computing system 140 may have the flexibility to re-encrypt the same data using different encryption algorithms or schemes on an as needed basis. To facilitate this flexibility, the investigation engine 142 may be used as a mechanism for a developer or tester to define a desired test and may facilitate configuration of the system so that the push mechanism 148 may pull the appropriate data from a production environment and homomorphically encrypt the data in an appropriate way for the configured tests. In some cases, the HE-based testing coordination computing system may coordinate with one or more remote agents (e.g., agents 135a and 135b) to manage pulling and/or encryption of at least a portion of the production data sets 133, 139 for testing.

In some case, the investigation engine may present a user interface to a developer, such via the network 105a to a remote computing device. The user interface may allow the developer or tester to define characteristics of tests to be performed on the application. For example, the user interface may include inputs defining testing goals, application operation, and the like, where the selection engine 144 may identify, based on the inputs, to identify an appropriate production data set 133 to be tested and an appropriate HE encryption algorithm to use to improve computational efficiency and/or reduce or minimize a testing time. In some cases, the selection engine 144 may include an artificial intelligence (AI) and/or machine learning (ML) component that may guide developers in setting up the tests and/or defining testing requirements. For example, the AI/ML component may identify, based on the user or application type, requirements of a previously performed test and may suggest that a similar test may be performed. In another example the AI/ML component may identify that certain parameters or aspects of complex implementations may be implemented. In some cases, entries of whether Boolean operations and/or arithmetic and statistical operations may be testing. For example, Boolean operations may include error checking and/or integrity validation, whereas mathematical operations correspond to finding an average, a mean, a standard deviation and the like. For testing Boolean operations, partial encryption homomorphic transformations may be performed. In some cases, encryption schemes can change over time. The homomorphic encryption algorithms may include modular arithmetic algorithms, powers exponential algorithms, garbled circuits algorithms, lattice-based algorithms and the like. Homomorphic algorithms used may include partially homomorphic encryption methods (e.g., unpadded Rivest-Shamir-Adleman (RSA) public key algorithms, ElGamal cryptosystem algorithms, Goldwasser-Micali cryptosystem algorithms and the like) and/or fully homomorphic encryption methods. The encryption method used may limit potential queries that may be used against the data.

The selection engine 144 may process instructions to determine which homomorphic encryption algorithm may be used, such as based on a use case definition of the testing to be done, and/or computational requirements of the use cases to improve computational efficiency when performing the testing using the encrypted data. In some cases, the configuration engine 146 may communicate a suggestion to break up tests of a test case into multiple test cases to speed results. For example, if the selection engine identifies a user case where arithmetic calculation intensive testing may be included in a first test case and Boolean testing may be included in a second test case, such that each test case may be tested using differently homomorphically encrypted data sets, where the encryption may be optimized in each for the particular arithmetic or Boolean tests so that the run time of the two test cases may be shorter and less computationally intensive than running the full test case on a fully encrypted data set. The selection engine 144 may consider a level of risk associated with the data sets, where all data sets may generally have a same level of security and may include sensitive information, but some algorithms may allow for some "leakage" of metadata associated with the data set, such as a data size or a key length, but not of actual data. For example, a low risk data set may be encrypted with an encryption algorithm that may allow some metadata leakage, but still maintains security over the data values. Some data sets may require fully homomorphic encryption algorithms, where a tradeoff is made with respect to computational efficiency. The selection engine 144 may minimize a size of the fully homomorphically encrypted data sets and/or minimize an amount of testing necessary to be performed in the test cases associated with the fully homomorphically encrypted data sets. Additionally, some partially HE arithmetic encryption schemes may only work for arithmetic functions, but not for others, such that results may not be verifiable when tested against the production data. While fully homomorphic encryption schemes may allow for verification of all operations, these schemes have large computational overhead.

In general, the selection engine may consider certain queries and/or operations that may be performed on the encrypted data sets when selecting the algorithms in the use cases. For example, the user interface presented to the user may provide a form that allows a user to describe tests to be performed, including a questionnaire use case definition input. Based off of the information inputted via the user interface, the selection engine may select an appropriate data set, and trigger encryption, such as by the push mechanism 148 and/or the encryption agents 135a, 135b, where the encryption has an appropriate encryption level. Once encrypted, the encrypted data set may be pushed to appropriate testing computing system and stored in a data store (e.g., data store 123, data store 126, data store 129). During testing on one of the testing computing systems 120, the application processes the encrypted data as it would process real data. While homomorphically encrypted, its format is preserved. Any function performed against encrypted data are the same as those that are performed against unencrypted data and the result of any function call is still encrypted. These encrypted results may be communicated from the testing computing systems 120 to the verification data store 152 for processing. The verification engine 150 may process similar test cases, or trigger the agent 135b to perform such testing, and may then reverse the HE transformation for the results of the test data and the verification data. The verification engine 150 may then verify whether the testing was successful and communicate that result to the test computing systems 120 and/or the developer computing environments, or other users as needed. In some cases, the verification engine 150 may access a table of expected results in the verification data store 152, where the expected results may be associated with a particular test case being run against the homomorphically encrypted data. In an illustrative example, the application 128 under test may operate against a homomorphically encrypted data set stored in the data store 129. When running, the application 128 will not know whether a result is correct, as the result remains encrypted. The test data may be communicated via the network 105a to the verification engine 150 for analysis. The verification engine may reverse the homomorphic encryption and may compare the result against the production data.

During testing, a use case may chain multiple operations together. Such information may be processed during the use case calculation by the selection engine. For example, an AI/ML engine may identify if a use case may perform too many HE calculations in a row so that data fidelity may be lost, and therefore the homomorphic properties may be lost over time. The AI/ML engine may then suggest breaking up the use case into multiple use cases, and/or may select a homomorphic algorithm capable of processing the use case, while taking into account computational efficiency and/or processing times for each option. In some cases, the selection engine 144 may automatically select a homomorphic encryption algorithm to be used. In some cases, the selection engine 144 may prompt a user to select whether to optimize the testing for computational efficiency or whether to proceed with the test case as proposed. Based on the user input received, the selection engine 144 may select an appropriate homomorphic encryption algorithm to apply to the production data set to be tested. In some cases, the selection engine 144 may process the input by querying a table of algorithms stored in the HE algorithm data store. For example, the table may include HE algorithms and associated selection criteria including, but not limited to, sensitivity of the data, types of operations capable of being performed when encrypted, computational efficiency, and the like. In some cases, the selection engine may weight certain criteria more than others, where the weightings may change over time based on historical learning. For example, the selection engine may identify common patterns with testing of particular applications and may suggest similar tests when a similar use case has been encountered.

The staging server 160 may be configured as an intermediary, to further isolate the test computing environments 120 from the production computing environments 130. In some cases, all processing of the HE-based testing coordination computing system may be performed at a central location. In some cases, a decentralized system may be used, such that use case definition and algorithm selection may be determined at the central location, but actual encryption and data handling may be decentralized and performed by the agents 135a and 135b that operate in the production environments. In some cases, testing information and/or results may be stored in a blockchain for as a way to perform a decentralized audit logging of encryption transformations and test results.

Figure 2:
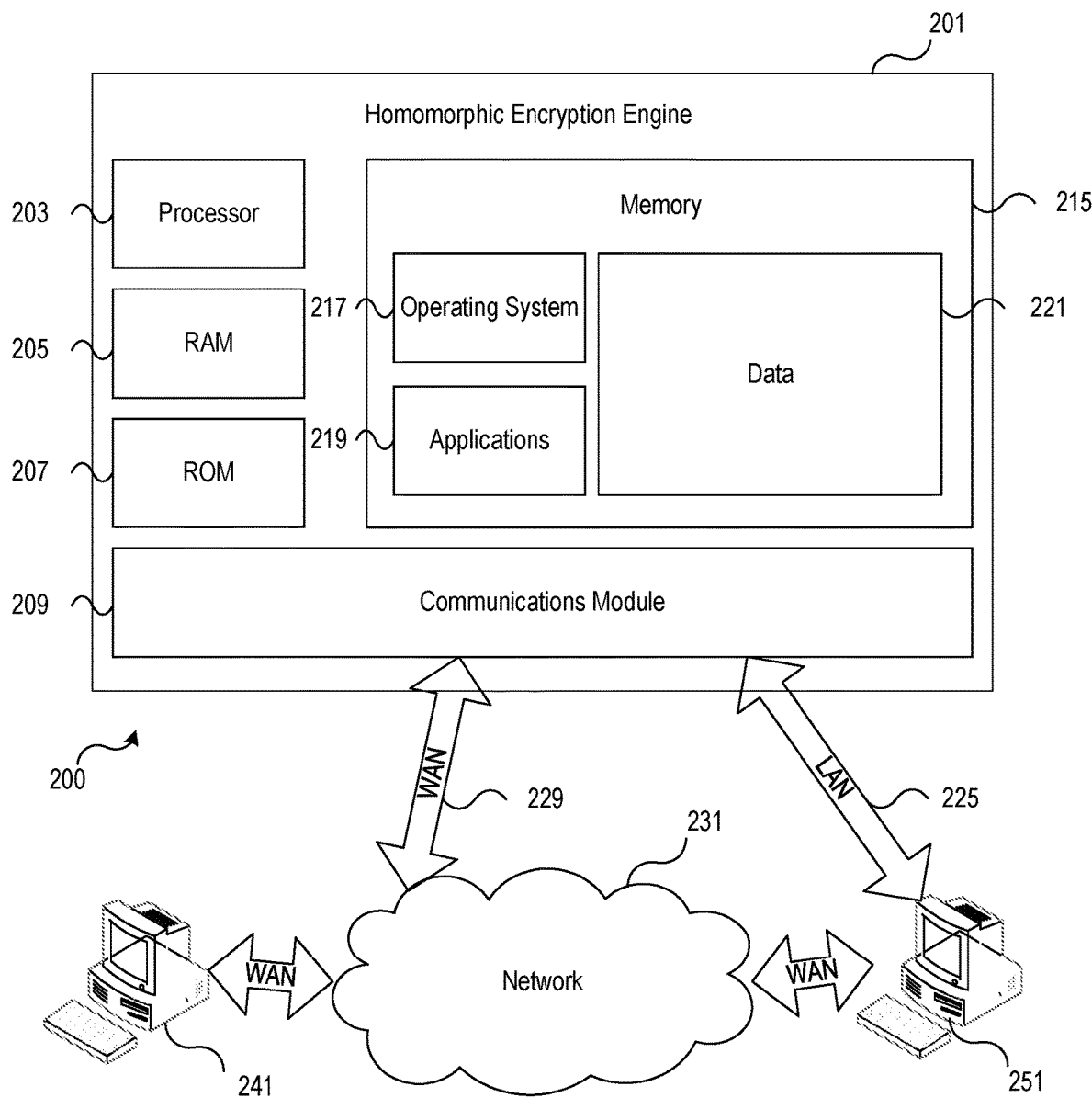
FIG. 2 shows an illustrative operating environment in which various aspects of the disclosure may be implemented in accordance with one or more aspects described herein.

FIG. 2 shows an illustrative operating environment in which various aspects of the present disclosure may be implemented in accordance with one or more example embodiments. Referring to FIG. 2, a computing system environment 200 may be used according to one or more illustrative embodiments. The computing system environment 200 is only one example of a suitable computing environment and is not intended to suggest any limitation as to the scope of use or functionality contained in the disclosure. The computing system environment 200 should not be interpreted as having any dependency or requirement relating to any one or combination of components shown in the illustrative computing system environment 200.

The computing system environment 200 may include an illustrative homomorphic encryption engine 201 having a processor 203 for controlling overall operation of the homomorphic encryption engine 201 and its associated components, including a Random-Access Memory (RAM) 205, a Read-Only Memory (ROM) 207, a communications module 209, and a memory 215. The homomorphic encryption engine 201 may include a variety of computer readable media. Computer readable media may be any available media that may be accessed by the homomorphic encryption threat analysis engine 201, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the homomorphic encryption threat analysis engine 201.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 203 of the homomorphic encryption threat analysis engine 201. Such a processor may execute computer-executable instructions stored on a computer-readable medium.

Software may be stored within the memory 215 and/or other digital storage to provide instructions to the processor 203 for enabling the homomorphic encryption engine 201 to perform various functions as discussed herein. For example, the memory 215 may store software used by the homomorphic encryption threat analysis engine 201, such as an operating system 217, one or more application programs 219, and/or an associated database 221. In addition, some or all of the computer executable instructions for the homomorphic encryption engine 201 may be embodied in hardware or firmware. Although not shown, the RAM 205 may include one or more applications representing the application data stored in the RAM 205 while the homomorphic encryption engine 201 is on and corresponding software applications (e.g., software tasks) are running on the homomorphic encryption threat analysis engine 201.

The communications module 209 may include a microphone, a keypad, a touch screen, and/or a stylus through which a user of the homomorphic encryption engine 201 may provide input, and may include one or more of a speaker for providing audio output and a video display device for providing textual, audiovisual and/or graphical output. The computing system environment 200 may also include optical scanners (not shown).

The homomorphic encryption engine 201 may operate in a networked environment supporting connections to one or more remote computing devices, such as the computing devices 241 and 251. The computing devices 241 and 251 may be personal computing devices or servers that include any or all of the elements described above relative to the homomorphic encryption threat analysis engine 201.

The network connections depicted in FIG. 2 may include a Local Area Network (LAN) 225 and/or a Wide Area Network (WAN) 229, as well as other networks. When used in a LAN networking environment, the homomorphic encryption engine 201 may be connected to the LAN 225 through a network interface or adapter in the communications module 209. When used in a WAN networking environment, the homomorphic encryption engine 201 may include a modem in the communications module 209 or other means for establishing communications over the WAN 229, such as a network 231 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 3:
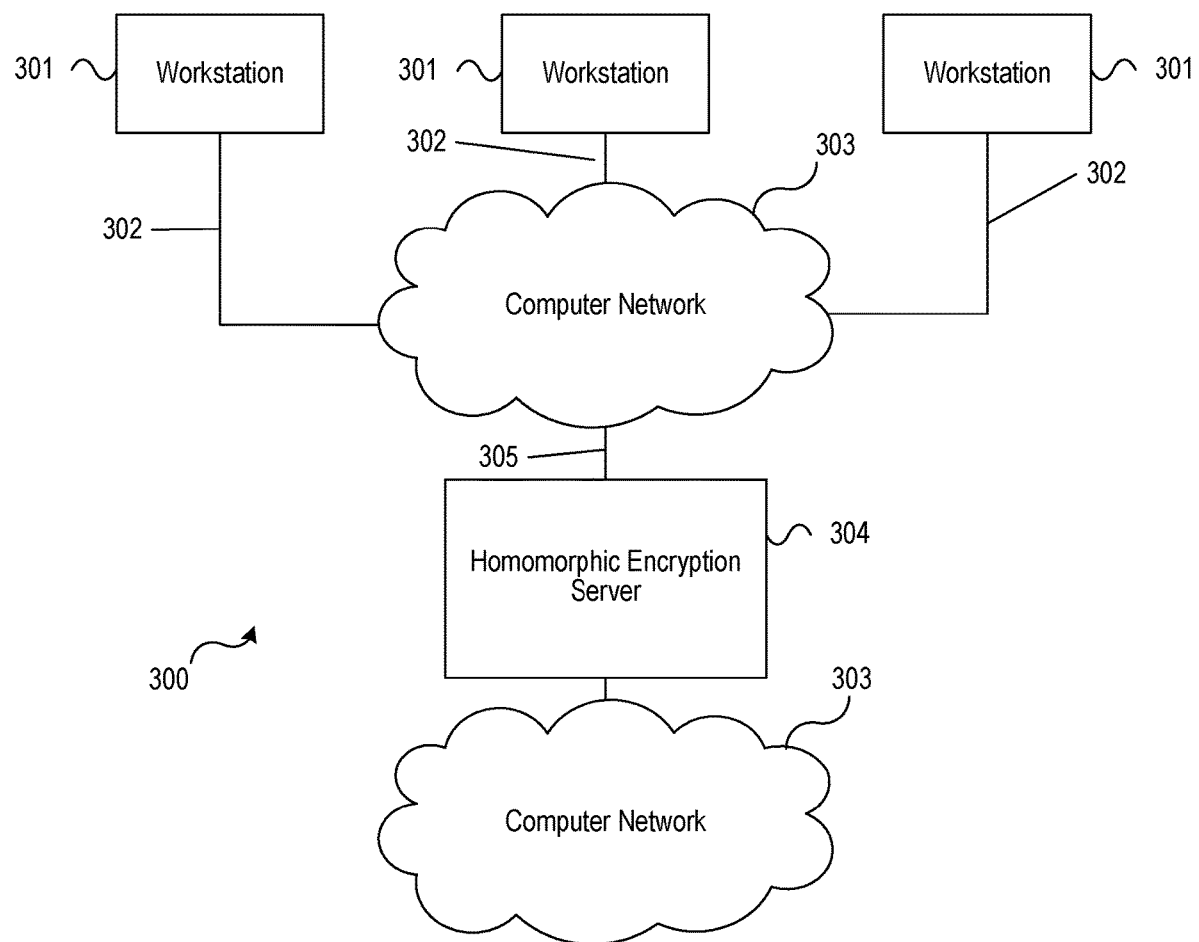
FIG. 3 shows an illustrative block diagram of workstations and servers that may be used to implement the processes and functions of certain aspects of the present disclosure in accordance with one or more aspects described herein.

FIG. 3 shows an illustrative block diagram of workstations and servers that may be used to implement the processes and functions of certain aspects of the present disclosure in accordance with one or more example embodiments. For example, an illustrative system 300 may be used for implementing illustrative embodiments according to the present disclosure. As illustrated, the system 300 may include one or more workstation computers 301. The workstation 301 may be, for example, a desktop computer, a smartphone, a wireless device, a tablet computer, a laptop computer, and the like, configured to perform various processes described herein. The workstations 301 may be local or remote, and may be connected by one of the communications links 302 to a computer network 303 that is linked via the communications link 305 to the homomorphic encryption server 304. In the system 300, the homomorphic encryption server 304 may be a server, processor, computer, or data processing device, or combination of the same, configured to perform the functions and/or processes described herein. The homomorphic encryption server 304 may be used to monitor network communications, identify potential instances of malicious activity by analyzing one or more data sets encrypted using homomorphic encryption techniques and using a homomorphically encrypted query and ensure data security of sensitive and/or private information contained in the data sets.

The computer network 303 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 302 and 305 may be communications links suitable for communicating between the workstations 301 and the homomorphic encryption server 304, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. Non-transitory memory storing instructions that, when executed by a processor, cause a computing platform to:
   generate a homomorphically encrypted data set via encryption of a production data set using a homomorphic encryption algorithm;
   push the homomorphically encrypted data set to a test computing system;
   trigger, the test computing system, to test a test case with a first version of an application using the homomorphically encrypted data set;
   trigger, a testing coordination computing system to test the test case with the application on the production data set; and
   communicate, based on a comparison of first test results resulting from testing with the homomorphically encrypted data set and second test results resulting from testing with the production data set and via a communication interface to a computing device via a network, an indication of success or failure of the testing of the first version of the application.

2. The non-transitory memory of claim 1, wherein the instructions further cause the computing platform to:
   cause presentation, via a user interface at the computing device, a user interface screen with at least one user input corresponding to the test case; and
   determine, by a selection engine and based on the test case, the homomorphic encryption algorithm.

3. The non-transitory memory of claim 1, wherein the homomorphic encryption algorithm comprising a partial homomorphic algorithm.

4. The non-transitory memory of claim 1, wherein the homomorphic encryption algorithm comprising a fully homomorphic algorithm.

5. The non-transitory memory of claim 1, wherein the instructions further cause the computing platform to:
identify, by a selection engine, operations performed within the test case; and
determine, by a selection engine and based on the operations, the homomorphic encryption algorithm.

6. The non-transitory memory of claim 1, wherein the instructions further cause the computing platform to store, in a data store, the first test results resulting from testing of the test case on the homomorphically encrypted data set.

7. The non-transitory memory of claim 1, wherein the instructions further cause the computing platform to store, in a data store, one or both of the first test results resulting from testing of the test case on the homomorphically encrypted data set and the second test results resulting from testing of the test case on the production data set.

8. A method comprising:
providing, by a test coordination computing system, a homomorphically encrypted data set comprising a production data set encrypted using a homomorphic encryption algorithm;
triggering, by a test computing system, creation first test results based on testing of a test case with a first version of an application using the homomorphically encrypted data set;
triggering, by the testing coordination computing system, creation of second test results based on testing of the test case with the application on the production data set; and
communicating, based on a comparison of the first test results and the second test results and to a computing device via a network, an indication of success or failure of the testing of the first version of the application.

9. The method of claim 8, comprising:
causing presentation, via a user interface at the computing device, a user interface screen with at least one user input corresponding to the test case; and
determining, by a selection engine and based on the test case, the homomorphic encryption algorithm.

10. The method of claim 8, wherein the homomorphic encryption algorithm comprising a partial homomorphic algorithm.

11. The method of claim 8, wherein the homomorphic encryption algorithm comprising a fully homomorphic algorithm.

12. The method of claim 8, comprising:
identifying, by a selection engine, operations performed within the test case; and
determining, by a selection engine and based on the operations, the homomorphic encryption algorithm.

13. The method of claim 8, comprising storing, in a data store, the first test results resulting from testing of the test case on the homomorphically encrypted data set.

14. The method of claim 8, comprising storing, in a data store, one or both of the first test results resulting from testing of the test case on the homomorphically encrypted data set and the second test results resulting from testing of the test case on the production data set.

15. A system comprising:
a production computing environment processing an application and storing a production data store; and
a computing platform comprising:
a processor; and
non-transitory memory storing instructions that, when executed by the processor, cause the computing platform to:
provide, to a test computing environment, a homomorphically encrypted data set comprising at least a portion of a production data set stored on the production computing environment that has been encrypted using a homomorphic encryption algorithm;
trigger, in the test computing environment, testing of a test case with an application and using the homomorphically encrypted data set;
trigger, in the test computing environment, testing of the test case with the application on the production data set; and
communicate, based on a comparison of first test results generated via testing performed using the homomorphically encrypted data set and second test results generated via testing performed using the production data set and via a communication interface to a computing device via a network, an indication of success or failure of the testing of the application.

16. The system of claim 15, wherein the instructions further cause the computing platform to:
cause presentation, via a user interface at the computing device, a user interface screen with at least one user input corresponding to the test case; and
determine, by a selection engine and based on the test case, the homomorphic encryption algorithm.

17. The system of claim 15, wherein the homomorphic encryption algorithm comprising a partial homomorphic algorithm.

18. The system of claim 15, wherein the homomorphic encryption algorithm comprising a fully homomorphic algorithm.

19. The system of claim 15, wherein the instructions further cause the computing platform to:
identify, by a selection engine, operations performed within the test case; and
determine, by a selection engine and based on the operations, the homomorphic encryption algorithm.

20. The system of claim 15, wherein the instructions further cause the computing platform to store, in a data store, one or both of the first test results resulting from testing of the test case on the homomorphically encrypted data set and the second test results resulting from testing of the test case on the production data set.

* * * * *